United States Patent

Ellis et al.

[11] Patent Number: 5,897,935
[45] Date of Patent: Apr. 27, 1999

[54] SYSTEM AND METHOD FOR FASTENING INSULATING LAYER TO SHEET MATERIAL

[75] Inventors: William J. Ellis; John Peter Vander Wal, both of Belmont; Randolph H. Barnard, III, Rockford; Paul Berklich, Belmont, all of Mich.

[73] Assignee: Cascade Engineering, Inc., Grand Rapids, Mich.

[21] Appl. No.: 08/900,272

[22] Filed: Jul. 25, 1997

Related U.S. Application Data

[60] Provisional application No. 60/021,010, Jul. 26, 1996.
[51] Int. Cl.$^6$ ...................................................... B32B 7/08
[52] U.S. Cl. ........................................... 428/223; 24/711.1
[58] Field of Search .................................... 428/101, 223; 24/711.1

[56] References Cited

U.S. PATENT DOCUMENTS

| | | | |
|---|---|---|---|
| 3,734,375 | 5/1973 | Bone et al. | 227/67 |
| 3,735,908 | 5/1973 | Kinney et al. | 227/67 |
| 3,875,648 | 4/1975 | Bone | 29/417 |
| 4,039,078 | 8/1977 | Bone | 206/343 |
| 4,111,347 | 9/1978 | Bone | 227/68 |
| 4,121,487 | 10/1978 | Bone | 83/23 |
| 4,593,844 | 6/1986 | Bone | 227/67 |
| 4,654,935 | 4/1987 | Bone | 24/150 FP |
| 4,696,300 | 9/1987 | Anderson | 123/334 R |
| 5,104,700 | 4/1992 | Peterson | 428/101 |

*Primary Examiner*—Alexander Thomas
*Attorney, Agent, or Firm*—Rader, Fishman, Grauer & Mc Garry

[57] ABSTRACT

A dash mat assembly (10) for installation in a vehicle includes an acoustic barrier layer (12) attached to an absorber layer (14). The acoustic barrier layer (12) is formed of relatively stiff material while the absorber layer (14) is formed of relatively flexible material. The inner surface of the acoustic, barrier layer (12) is in direct contact with the outer surface of the absorber layer. Fasteners (16) are provided for attaching the layers together. Each fastener has an elongate pin (22) with opposite ends and a flexible holding flange (24, 26) integrally molded at each end of the pin (22). The flanges (24, 26) normally extend generally transverse to a central axis of the pin and the length of each flange is greater than a cross-sectional dimension of the pin. The fasteners (16) extend completely through the acoustic barrier layer (12) and can, extend either partially or completely through the absorber layer (14). The length of the pin (22) is shorter than the combined thickness of the layers such that the layers are held together under compression. A method of attaching the layers together is also disclosed.

15 Claims, 2 Drawing Sheets

SYSTEM AND METHOD FOR FASTENING INSULATING LAYER TO SHEET MATERIAL

This application claims the benefit of U.S. Provisional Application No. 60/021,010 filed on Jul. 26, 1996.

BACKGROUND OF THE INVENTION

1. Field of the Invention

This invention relates to sound insulation and to the attachment of an insulating layer to a sheet material, for example, dash mats for automobiles.

2. Description of the Related Art

In most contemporary automobiles, a steel fire wall separates the engine compartment from the passenger compartment. To reduce the transmission of sound from the engine compartment through the fire wall and into the passenger compartment, a sound barrier mat (otherwise known as a dash mat) is typically constructed of an elastomeric material and is mounted to and substantially overlies the fire wall. An absorber layer, typically constructed of an open cell foam material, is attached to the sound barrier mat and interfaces between the sound barrier mat and the firewall. An outer surface of the sound barrier mat is typically in contact with a bottom surface of the vehicle carpet and extends beyond the carpet to an upper portion of the fire wall behind the instrument panel. It is common to attach the absorber material to the sound barrier mat through the application of hot melt glue or spray adhesive. Adhesives that are capable of bonding the foam material to the elastomeric mat are dissolved in solvents which are typically ozone depleting and must be handled with extreme care. Many of these types of adhesives are no longer being manufactured due to environmental concerns and new industrial standards. A technique known as heat staking has been used as an alternative to ozone-depleting adhesives. However, the layers must be properly aligned and temporarily fastened together before heat staking. It would be advantageous to attach the absorber layer to the sound insulating layer without the difficulties encountered with adhesives or temporary fasteners.

SUMMARY OF THE INVENTION

These and other problems of the prior art are overcome by the provision of a system and method for mechanically fastening an absorber layer to a sound barrier layer.

According to one aspect of the invention, a method for attaching a relatively rigid acoustical barrier layer directly to a relatively compressible absorber layer comprises aligning the layers in a predetermined position with respect to each other and positioning the layers in mutual contact; providing at least one fastener having an elongate pin with opposite ends and a flexible holding flange integrally molded at each end of the pin, the flanges normally extending generally transverse to a central axis of the pin, the length of each flange being greater than a cross sectional dimension of the pin; forming an aperture that extends completely through one of the layers and at least partially through the other of the layers, a cross-sectional dimension of the aperture being smaller than the length of each holding flange; orienting one of the holding flanges in a direction substantially parallel to the central axis of the pin and inserting the one holding flange through the aperture until the other of the holding flanges is at least in close proximity to an outer surface of the one layer; and reorienting the one holding flange generally transverse to the aperture to thereby hold the layers together.

According to a further aspect of the invention, a dash mat assembly for installation in a vehicle includes an acoustic barrier layer attached to an absorber layer. The acoustic barrier layer and absorber layer each have inner and outer surfaces. The acoustical barrier layer is formed of relatively stiff material while the absorber layer is formed of relatively flexible material. The inner surface of the acoustic barrier is in direct contact with the outer surface of the absorber layer. At least one fastener is provided for attaching the layers together. The fastener has an elongate pin with opposite ends and a flexible holding flange integrally molded at each end of the pin. The flanges normally extend generally transverse to a central axis of the pin and the length of each flange is greater than a cross-sectional dimension of the pin. The fastener extends completely through the acoustic barrier layer and at least partially through the absorber layer such that one of the flanges abuts the outer surface of the acoustic barrier layer and the other of the flanges is spaced from the inner surface of the acoustic barrier and in contact with the absorber layer in a generally transverse orientation with respect to the pin to thereby hold the layers together.

In one embodiment, the length of the pin is shorter than the combined thickness of the layers such that the layers are held together under compression with the other holding flange abutting the inner surface of the absorber layer.

In a further embodiment, the other holding flange is positioned between the inner and outer surfaces of the absorber layer to hold the layers together.

The fastener can be inserted through the layers by inserting a needle of a fastening tool through the layers and then ejecting the fastener from the fastening tool to mechanically connect the two layers together. A plurality of fasteners can be injected through the layers in the same manner to further secure the two layers together.

BRIEF DESCRIPTION OF THE DRAWINGS

The invention will now be described with reference to the drawings in which.

DETAILED DESCRIPTION OF THE PREFERRED EMBODIMENTS

Figure 1:
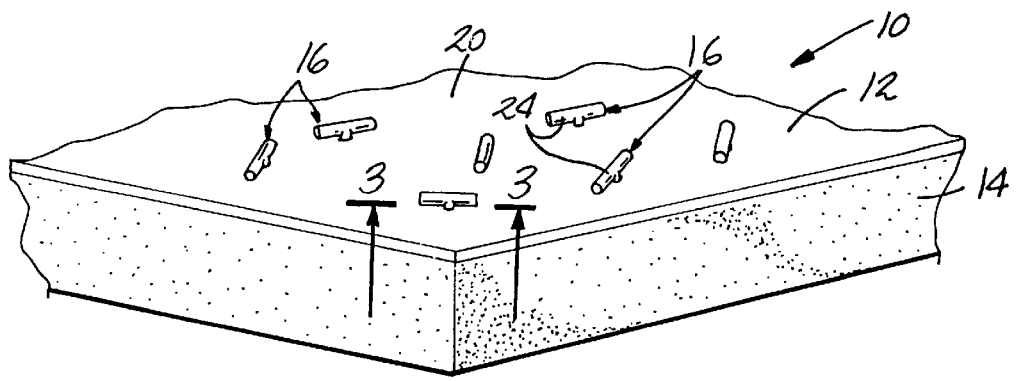
FIG. 1 is a top perspective view of a sound barrier mat and absorber mat mechanically fastened together according to the invention.
Figure 2:
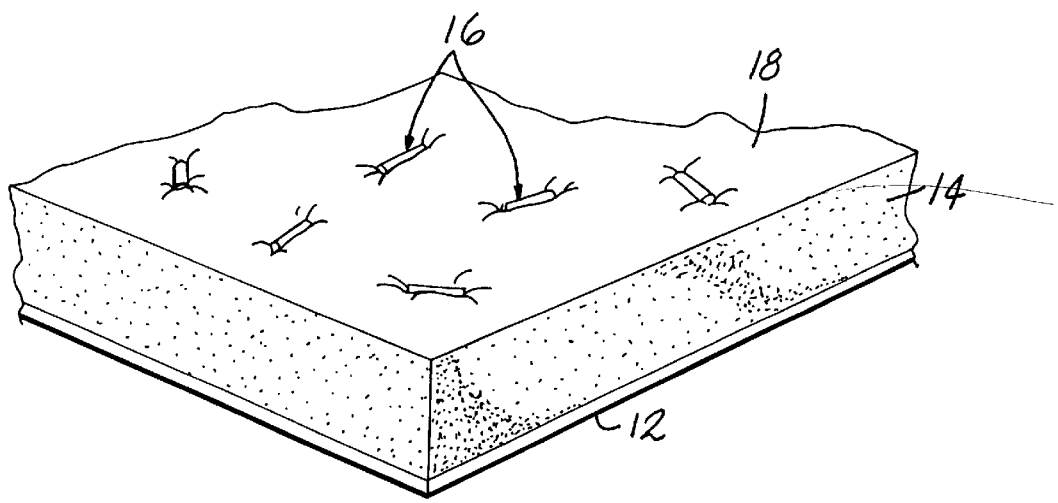
FIG. 2 is a bottom perspective view of the sound barrier mat and absorber mat mechanically fastened together.
Figure 3:
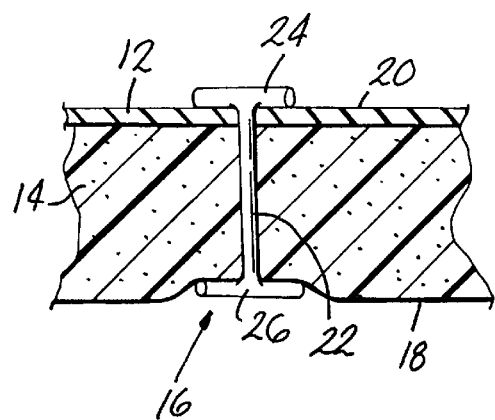
FIG. 3 is a cross sectional view of the mats taken along line 3—3 of FIG. 1 and illustrating the mechanical interconnection of the mats.

Referring now to FIGS. 1–3, a dash mat assembly 10 includes an outer sound barrier mat or layer 12 and an inner absorber mat or layer 14. The outer sound barrier mat 12 is preferably formed of a relatively stiff elastomeric material, while the inner absorber mat 14 is formed of a flexible foam material or fiberglass batting. An inner surface 18 of the mat 14 is typically positioned against a vehicle firewall (not shown), while an outer surface thereof faces an inner surface of the sound barrier mat 12. An outer surface 20 of the mat 12 faces the underside of a vehicle carpet (not shown) and typically extends past the carpet behind the instrument panel.

A mechanical fastener 16 has an elongate central pin 22 integrally attached to an outer securing tab 24 and an inner securing tab 26. The pin 22 is preferably centrally located between the ends of each securing tab 24, 26. As illustrated in FIG. 3, the pin 22 is dimensioned such that the inner securing tab 26 is pressed into the flexible absorbent layer 14 when installed. The absorbent layer 14 presses against inner tab 26 and forces outer tab 24 against the sound barrier layer 12.

Figure 4:
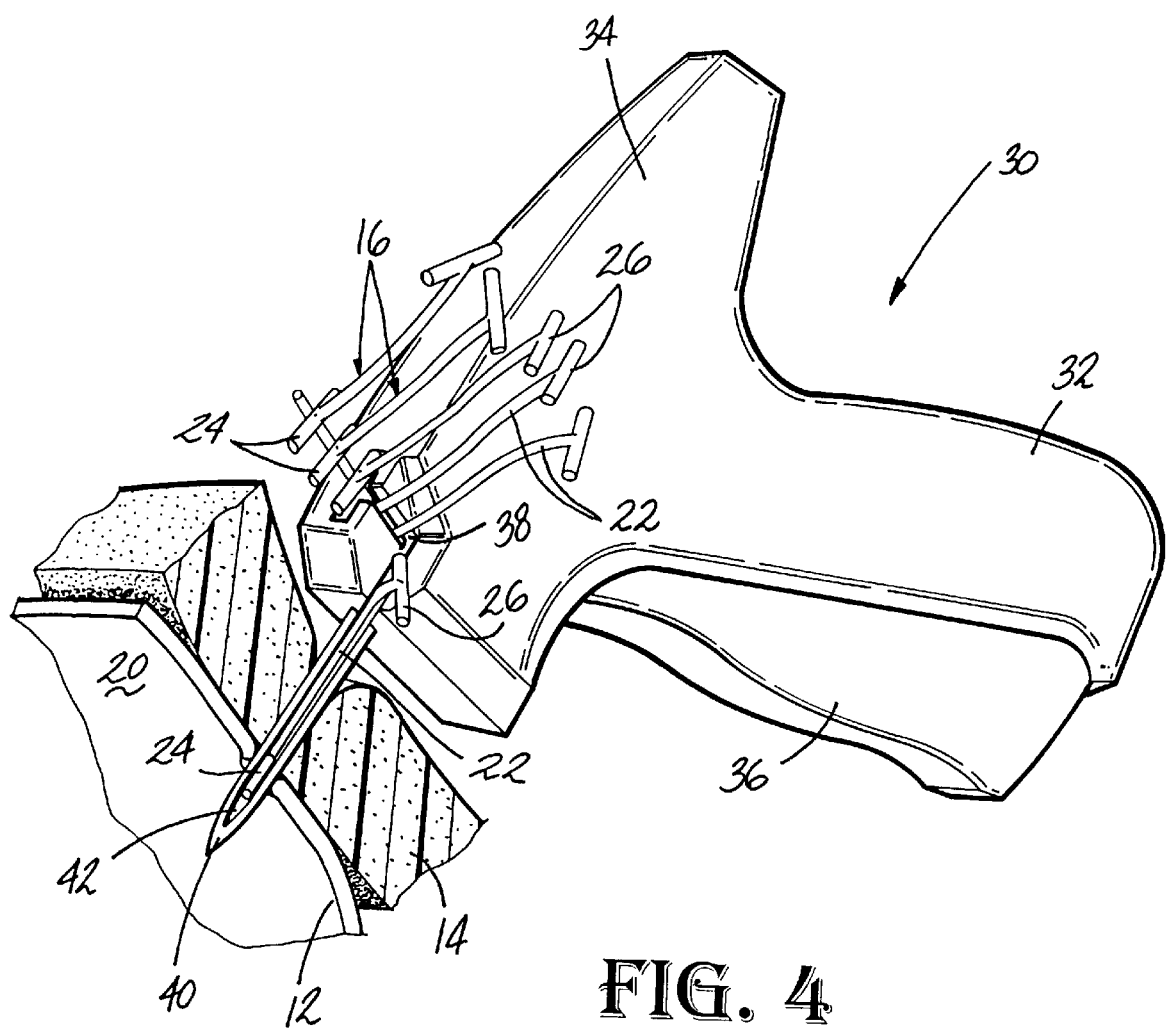
FIG. 4 is a perspective view of a fastener insertion tool and the mats in cross section with a fastener being inserted through the mats.

Referring now to FIG. 4, a fastener insertion tool 30 for use with the present invention has a hand grip portion 32 and a fastener ejection portion 34. The hand grip portion 32 includes a trigger 36 that is gripped and pressed by the fingers of a user. The fastener ejection portion 34 has a slot 38 for receiving a set of connected fasteners 16 and an internal mechanism (not shown) for severing the fasteners and feeding the outer securing tab 24 through a hollow needle 40 having a slot 42 extending along the longitudinal axis of the needle 40 when the trigger 36 is pressed. Further details of the fastener 16 and insertion tool 30 are described in U.S. Pat. Nos. 4,121,487 and 4,111,347 assigned to Dennison Manufacturing Co. of Framingham, Mass., the disclosures of which are hereby incorporated by reference.

In use, an operator positions the absorber layer 14 over the sound barrier layer 12 in the correct orientation. The hollow needle 40 is then pressed through both layers 14, 12 until a portion of the needle extends beyond the outer surface 20 of the sound barrier layer 12. Preferably, the needle 40 forms an aperture in both of the layers 12, 14. However, an aperture can be preformed in one or both of the layers to facilitate needle placement and insertion. The trigger 36 is then squeezed by an operator until the outer securing tab 24 clears the layer 12. The trigger is subsequently released and the needle is withdrawn from the layers. This procedure can be followed several times, as shown by the fasteners 16 in FIGS. 1 and 2, to further secure the layers 12, 14 together. Although FIG. 4 shows the hollow needle 40 inserted first through layer 14 and then through layer 12, the needle 40 can be inserted initially through layer 12 and then through layer 14. In this instance, the tab 26 need not be passed entirely through the layer 14. The tab 26 can be displaced inside the layer 14, such that the inner surface 18 of the layer 12 is free of tabs.

A unique advantage of this arrangement over conventional securing techniques allows the foam material to slide over the stiffer elastomeric material when flexed, thereby eliminating shearing of the foam material and thus separation of the foam material from the elastomeric material at the shear interface. Thus, a simple, effective and cost reducing means is provided for attaching an absorber layer to a sound barrier layer, either temporarily or permanently. For example, a door in a mat can be folded back and tacked with the fasteners 16 while cables or other components are passed through the door. The fastener can then be cut and the door folded back into its normal position.

The invention finds particular use in automobile dash mats in which an injection molded elastomeric barrier layer is attached to a synthetic elastomeric foam layer. The barrier layer is typically a filled elastomeric moldable polymer, e.g., elastomeric polypropylene. The foam can be any flexible foam, for example, polyurethane.

The invention also finds use in other composite layers in automotive or non-automotive applications wherein fiberglass or other similar backing can be attached temporarily or permanently to a support surface. For example, the fasteners of the invention can be used to attach fabric and fiberglass to a barrier support in a wall panel. The invention can also be used, for example, for securing fabric to a headliner or fabric to a soft fiberglass or similar backing in a door panel or in a dash panel prior to installation of the layers into the vehicle.

Reasonable variation and modification are possible within the spirit of the foregoing specification and drawings without departing from the scope of the invention.

The embodiments for which an exclusive property or privilege is claimed are defined as follows:

1. A method for assembling a sound insulating dashmat laminate comprising an elastomeric acoustical barrier layer having sound blocking acoustical properties and a substantially coextensive absorber layer, which is compressible relative to the acoustic barrier layer, by attaching the acoustical barrier layer directly to the absorber layer comprising the steps of:

aligning the acoustical barrier and absorber layers in a predetermined position with respect to each other and positioning the layers in mutual contact;

providing at least one fastener having an elongate pin with opposite ends and a flexible holding flange integrally molded at each end of the pin, the flanges normally extending generally transverse to a central axis of the pin, the length of each flange being greater than a cross sectional dimension of the pin;

forming an aperture that extends completely through one of the layers and at least partially through the other of the layers, a cross-sectional dimension of the aperture being smaller than the length of each holding flange;

orienting one of the holding flanges in a direction substantially parallel to the central axis of the pin and inserting the one holding flange through the aperture until the other of the holding flanges is at least in close proximity to an outer surface of the one layer; and reorienting the one holding flange generally transverse to the aperture to thereby hold the layers together.

2. A method according to claim 1 wherein the step of forming an aperture includes forming the aperture completely through the absorber layer and the step of inserting the one holding flange includes inserting the one holding flange completely through the absorber layer such that the one holding flange is positioned on an outer surface thereof.

3. A method according to claim 2 wherein the length of the pin is shorter than the combined thickness of the layers such that the layers are held together under compression.

4. A method according to claim 2 wherein the step of forming the aperture is performed simultaneously with the inserting step.

5. A method according to claim 1 wherein the inserting step includes inserting the one holding flange only partially through the other layer such that the one holding flange is positioned between opposed surfaces of the other layer.

6. A method according to claim 1 wherein multiple fasteners are inserted through the aligned layers at spaced locations with the providing, forming, orienting and reorienting steps.

7. A dash mat assembly for installation in a vehicle, comprising:

an elastomeric acoustic barrier layer having inner and outer surfaces and formed of relatively stiff material;

a substantially coextensive absorber layer having inner and outer surfaces and formed of relatively flexible material and compressible relative to the acoustic barrier layer, the inner surface of the acoustic barrier layer being in coextensive direct contact with the outer surface of the absorber layer;

at least one fastener having an elongate pin with opposite ends and a flexible holding flange integrally molded at each end of the pin, the flanges normally extending generally transverse to a central axis of the pin, the length of each flange being greater than a cross sectional dimension of the pin, the fastener extending completely through the acoustic barrier layer and at least partially through the absorber layer such that one of the flanges abuts the outer surface of the acoustic barrier layer and the other of the flanges is spaced from the inner surface of the acoustic barrier layer and in contact with the absorber layer in a generally transverse orientation with respect to the pin to thereby hold the layers together.

8. A dash mat assembly according to claim 7 wherein the other holding flange abuts the inner surface of the absorber layer.

9. A dash mat according to claim 8 wherein the length of the pin is shorter than the combined thickness of the layers such that the layers are held together under compression.

10. A dash mat according to claim 7 wherein the other holding flange is positioned between the inner and outer surfaces of the absorber layer. and compressible relative to the acoustic barrier layer.

11. A dash mat according to claim 7 wherein there are multiple fastners at spaced locations extending through the acoustic barrier layer and absorber layer to secure the two layers together.

12. A method for attaching an acoustical barrier layer directly to an absorber layer, which is compressible relative to the acoustic barrier layer, the method comprising:

aligning the layers in a predetermined position with respect to each other and positioning the layers in mutual contact;

providing at least one fastener having an elongate pin with opposite ends and a flexible holding flange integrally molded at each end of the pin, the flanges normally extending generally transverse to a central axis of the pin, the length of each flange being greater than a cross-sectional dimension of the pin;

forming an aperture that extends completely through one of the layers and at least partially through the other of the layers, a cross-sectional dimension of the aperture being smaller than the length of each said holding flange;

orienting one of the holding flanges in a direction substantially parallel to the central axis of the pin and inserting the one holding flange through the aperture until the other of the holding flanges is at least in close proximity to an outer surface of the one layer and the one holding flange is only partially through the outer layer such that the one holding flange is positioned between opposed surfaces of the other layer; and reorienting the holding flange generally transverse to the aperture to thereby hold the layers together.

13. A method according to claim 12 wherein the step of forming an aperture includes forming the aperture completely through the absorber layer and the step of inserting the one holding flange includes inserting the one holding flange completely through the absorber layer such that the one holding flange is positioned on an outer surface thereof.

14. A method according to claim 13 wherein the length of the pin is shorter than the combined thickness of the layers such that the layers are held together under compression.

15. A method according to claim 13 wherein the step of forming the aperture is performed simultaneously with the inserting step.

\* \* \* \* \*

UNITED STATES PATENT AND TRADEMARK OFFICE
CERTIFICATE OF CORRECTION

PATENT NO.: 5,897,935

DATED: April 27, 1999

INVENTORS: ELLIS ET AL.

It is certified that error appears in the above-identified patent and that said Letters Patent is hereby corrected as shown below:

Column 5, claim 10, lines 17-20 should read:

10. A dash mat according to claim 7 wherein the other holding flange is positioned between the inner and outer surfaces of the absorber layer.

Signed and Sealed this

Twelfth Day of October, 1999

*Attest:*

Q. TODD DICKINSON

*Attesting Officer*     *Acting Commissioner of Patents and Trademarks*